US012560539B2

(12) United States Patent
Lendl et al.

(10) Patent No.: US 12,560,539 B2
(45) Date of Patent: Feb. 24, 2026

(54) METHOD AND APPARATUS FOR DETERMINING OPTICAL PROPERTIES OF A SAMPLE MATERIAL

(71) Applicant: TECHNISCHE UNIVERSITÄT WIEN, Vienna (AT)

(72) Inventors: Bernhard Lendl, Vienna (AT); Bernhard Schmauss, Theisseil (DE); Matthias Bär, Erlangen (DE)

(73) Assignee: TECHNISCHE UNIVERSITÄT WIEN, Vienna (AT)

( * ) Notice: Subject to any disclaimer, the term of this patent is extended or adjusted under 35 U.S.C. 154(b) by 0 days.

(21) Appl. No.: 17/432,598

(22) PCT Filed: Feb. 21, 2020

(86) PCT No.: PCT/EP2020/054668
§ 371 (c)(1),
(2) Date: Aug. 20, 2021

(87) PCT Pub. No.: WO2020/169827
PCT Pub. Date: Aug. 27, 2020

(65) Prior Publication Data
US 2022/0120680 A1 Apr. 21, 2022

(30) Foreign Application Priority Data

Feb. 22, 2019 (DE) .......................... 102019104556.8

(51) Int. Cl.
*G01N 21/552* (2014.01)
*G01J 3/02* (2006.01)
(Continued)

(52) U.S. Cl.
CPC .......... *G01N 21/552* (2013.01); *G01J 3/0224* (2013.01); *G01J 3/42* (2013.01); *G01N 21/21* (2013.01); *G01N 2021/3595* (2013.01)

(58) Field of Classification Search
CPC ................. G01N 21/552; G01N 21/21; G01N 2021/3595; G01N 21/274; G01J 3/0224; G01J 3/42; G01J 3/28
See application file for complete search history.

(56) References Cited

U.S. PATENT DOCUMENTS

| | | | | |
|---|---|---|---|---|
| 3,614,198 | A | * | 10/1971 | Martin ..................... G02B 6/34 |
| | | | | 385/129 |
| 3,902,807 | A | * | 9/1975 | Fleming ............... G01N 21/552 |
| | | | | 250/343 |

(Continued)

FOREIGN PATENT DOCUMENTS

| | | | | |
|---|---|---|---|---|
| DE | 10122917 | A1 | * 11/2002 | ........... G01N 21/474 |
| DE | 10145719 | A1 | 4/2003 | |

(Continued)

OTHER PUBLICATIONS

Burnett, J.H., Benck, E.C., Kaplan, S.G., Stover, E. and Phenis, A., 2020. Index of refraction of germanium. Applied optics, 59(13), pp. 3985-3991. (Year: 2020).*

(Continued)

*Primary Examiner* — Dominic J Bologna
*Assistant Examiner* — Mohamed Doumbia
(74) *Attorney, Agent, or Firm* — Daniel J. Chalker; Edwin S. Flores; Chalker Flores, LLP

(57) ABSTRACT

A method for determining optical properties of a sample material includes: determining a first intensity of light in a first polarization state that was reflected by the sample material; determining a second intensity of the light in a second polarization state that was reflected by the sample material; forming the ratio between the first intensity and the second intensity, or vice versa. Further, an apparatus for determining optical properties of a sample material, comprising at least one detector device for determining a first intensity of light in a first polarization state that was reflected (Continued)

by the sample material and for determining a second intensity of the light in a second polarization state that was reflected by the sample material and at least one computing unit for forming the ratio of the first intensity and the second intensity, or vice versa.

19 Claims, 5 Drawing Sheets

(51) Int. Cl.
  *G01J 3/42*    (2006.01)
  *G01N 21/21*   (2006.01)
  *G01N 21/35*   (2014.01)

(56)      References Cited

U.S. PATENT DOCUMENTS

| | | | | | |
|---|---|---|---|---|---|
| 4,883,963 | A | * | 11/1989 | Kemeny | G01N 21/4738 |
| | | | | | 359/287 |
| 9,242,309 | B2 | * | 1/2016 | Zediker | B23K 26/0652 |

| | | | | | |
|---|---|---|---|---|---|
| 2004/0256563 | A1 | * | 12/2004 | Uchida | A61B 5/14546 |
| | | | | | 250/339.11 |
| 2013/0335741 | A1 | * | 12/2013 | Hall | G01N 21/553 |
| | | | | | 356/369 |
| 2017/0003170 | A1 | * | 1/2017 | Kleczewski | H01S 5/0071 |
| 2017/0336259 | A1 | * | 11/2017 | Kawada | G01J 3/0224 |

FOREIGN PATENT DOCUMENTS

| | | | | | |
|---|---|---|---|---|---|
| EP | 3399299 | A1 | * | 11/2018 | G01N 33/2841 |
| JP | 2017181049 | A | * | 10/2017 | G01N 21/3563 |
| WO | 02/01203 | A1 | | 1/2002 | |

OTHER PUBLICATIONS

Nternational Search Report [ISA/EP] PCT/EP2020/054668 dated Jun. 9, 2020.

* cited by examiner

METHOD AND APPARATUS FOR DETERMINING OPTICAL PROPERTIES OF A SAMPLE MATERIAL

CROSS-REFERENCE TO RELATED APPLICATIONS

This application claims priority to and is a National Stage Patent Application of International Application No. PCT/EP2020/054668, filed on Feb. 21, 2020, which claims priority to DE 102019104556.8, filed on Feb. 22, 2019, the entire contents of each of which is incorporated by reference herein.

TECHNICAL FIELD OF THE INVENTION

The invention relates to a method and an apparatus for determining optical properties of a sample material.

BACKGROUND OF THE INVENTION

Optical properties of a sample material are often determined by means of spectroscopic measurement methods, such as spectroscopy based on attenuated and/or frustrated total internal reflection (ATR or FTIR). The advantage of such spectroscopy methods lies in particular in the fact that an absorption spectrum can be recorded despite a strong basic absorption of the sample material. It is known that the attenuation of the light wave at the surface between an ATR element and the sample material is different for different polarisations of the incident light wave and that the different polarisations also have a different phase offset.

For example, an HATR method (horizontal attenuated total reflection, HATR) is known from U.S. Pat. No. 7,920,264 B1, which method uses the phase offset for two different polarisation directions to measure the rotation of the polarisation plane through the sample material, i.e. for polarimetry.

Thermal emitters filtered with a monochromator for wavelength selection are often used as light sources for such spectroscopy methods. However, thermal emitters have the disadvantage that they have a low spectral power density and therefore a low intensity with narrow-band filtering. Alternatively, laser sources such as quantum cascade lasers are used in the above-mentioned spectroscopy methods. Although these represent very powerful light sources, especially in the mid- and far-infrared wavelength range, they have a high intensity noise compared to thermal emitters, and therefore the sensitivity is reduced, especially for sample material with low concentrations of the substance under investigation, and these can therefore no longer be measured. Also, the power density of these light sources is not constant over the wavelength, and therefore the measured spectrum must be compared with a reference measurement, in particular without or with known sample material. In this case, it is possible to simultaneously detect the reference measurement directly through an additional optical path and to subtract it from the measurement signal (balanced detection). The disadvantage of such an additional reference path is that it could also have a wave-dependent transmission and is also subject to other fluctuations, like the measurement path. The reference path should also preferably have an attenuation similar to the measurement path.

BRIEF SUMMARY OF THE INVENTION

The invention is now based on the object of providing a method and an apparatus for determining optical properties of a sample material which avoids the disadvantages of the prior art. In particular, the invention is also based on the object of providing an improved method and an improved apparatus for determining optical properties of a sample material, which method and apparatus advantageously reduce or suppress and/or eliminate the effects of the intensity noise of light sources.

This object is achieved by a method, preferably a spectroscopy method, further preferably an ATR infrared spectroscopy method, for determining optical properties of a sample material, which method comprises the following steps: a) determining a first intensity of light in a first polarisation state that was reflected by the sample material; b) determining a second intensity of light in a second polarisation state that was reflected by the sample material; c) forming the ratio of the first intensity and the second intensity or vice versa. This object is further achieved by an apparatus, preferably a spectrometer, further preferably an ATR infrared spectrometer, for determining optical properties of a sample material comprising: —at least one detector device for determining a first intensity of light in a first polarisation state that was reflected by the sample material and for determining a second intensity of light in a second polarisation state that was reflected by the sample material; —at least one computing unit for forming the ratio of the first intensity and the second intensity, or vice versa.

In particular, the method according to the invention is carried out by means of the apparatus, preferably according to one of claims 1 to 12. This is possible if the apparatus is used to carry out a method according to one of claims 1 to 12. It is further advantageous if step c) is carried out after steps a) and b).

The invention is based on the finding that by determining a first intensity of the light in a first polarisation state that was reflected by the sample material, by determining a second intensity of the light in a second polarisation state that was reflected by the sample material, and by subsequently forming the ratio of the first intensity and the second intensity or vice versa, the effects of the intensity noise of light sources on the measurement result are reduced or suppressed and/or eliminated. The invention thereby utilises the polarisation dependency of the light reflected by the sample material, in particular of the light reflected at the interface formed by the sample material and a reflection element, wherein in particular the different polarisations of the reflected light have different relative changes in the reflection. Surprisingly, it has been found that despite the forming of the ratio of the intensities of the reflected light of the two polarisation states, a signal remains, and at the same time, in particular, the intensity noise of the light source used is not included in the final signal. This eliminates the need for a reference path. Fluctuations caused by the measurement assembly itself are also not included in the signal, in particular as long as they affect both polarisation states in the same way.

The terms "polarisation state", "polarisation type", "polarisation direction", "degree of polarisation" and/or "polarisation" are preferably understood here to mean the direction of oscillation of light. In the wave model in particular, light is preferably a wave oscillating perpendicularly to its direction of propagation, i.e. in particular a transverse wave, so that here these terms are preferably understood to mean the direction of oscillation of a transverse wave. Preferably, the direction of oscillation refers to the field vector of the electric field, wherein in particular the field vector of the magnetic field oscillates perpendicularly thereto correspondingly. In particular, if the direction of oscillation changes rapidly and in a disordered manner, the light is preferably unpolarised light. The terms "polarisation state", "polarisation type", "polarisation direction", "degree of polarisation" and/or "polarisation" therefore denote in particular the ordered component.

It is further possible that the method is preferably a spectroscopy method, further preferably an ATR infrared spectroscopy method, an HATR infrared spectroscopy method, an FEWS (fibre evanescent eave spectroscopy) infrared spectroscopy method and/or an FTIR infrared spectroscopy method. It is also possible that the apparatus is preferably a spectrometer, further preferably an ATR-infrared spectrometer, an HATR-infrared spectrometer, an FEWS-infrared spectrometer and/or an FTIR-infrared spectrometer.

It is possible that the sample material is liquid and/or solid. For example, it is possible that the sample material comprises water, bacteria and/or solids. It is also conceivable that the sample material comprises one or more substances selected from the group: water, bacteria, viruses, solids, solvents, solvent mixtures, lacquer layers, polymer films, thermosets, body fluids, in particular blood, unicellular or multicellular organisms, fungi, plants, in particular algae.

Further advantageous embodiments of the invention are described in the dependent claims.

Preferably, the method further comprises the following step, in particular which is performed before steps a) and b): —splitting the light reflected by the sample material into the first polarisation state and the second polarisation state, preferably by means of at least one polariser, further preferably by means of a first polariser and a second polariser.

It is also advantageous if the apparatus further comprises at least one polariser, in particular for splitting the light reflected by the sample material into the first polarisation state and the second polarisation state, in particular if the apparatus comprises a first polariser for splitting the light reflected by the sample material into the first polarisation state and a second polariser for splitting the light reflected by the sample material into the second polarisation state.

"Polariser(s)" are preferably understood to mean components which filter electromagnetic waves, in particular light, such as light from the infrared wavelength range, of a certain polarisation out of electromagnetic waves which are not polarised, are partially polarised or are polarised differently. It is possible that polarisers use, in particular, mechanisms selected from the group of: dichroism, reflection, birefringence, scattering and/or diffraction to separate the different polarisations of the incident waves. For example, polarisers that separate a linearly polarised electromagnetic wave are called linear polarisers. Furthermore, for example, polarisers that separate circularly polarised light are called circular polarisers.

Advantageously, the at least one polariser, in particular the first polariser and the second polariser, is selected from the group of: polarisers based on birefringence, preferably polarisation prism, further preferably Nicol prism, Rochon prism, Glan-Thomson prism, polariser based on dichroism, preferably J-film and/or H-film, and/or polariser based on reflection, preferably Brewster window.

Preferably, the at least one polariser, in particular the first polariser and the second polariser, is a Brewster window. This makes it possible to separate the first and second polarisation states of the light reflected by the sample material, in particular ensuring that further polarisation states do not interfere with the measurement result.

It is further advantageous if the first and second polarisation states are different, in particular if the first and second polarisation states are linearly polarised states with mutually perpendicular oscillation planes, wherein preferably the first polarisation state is parallel polarised light and the second polarisation state is perpendicular polarised light, or vice versa. This makes it possible to obtain a maximum possible signal, preferably for the ratio of the first intensity and the second intensity, in particular wherein these polarisation states can also be easily separated by means of the above-mentioned polarisers.

It is also possible that in steps a) and/or b) the intensity of the light in the first and/or the second polarisation state that was reflected by the sample material is determined by means of at least one detector device, in particular that in steps a) and/or b) the intensity of the light in the first polarisation state that was reflected by the sample material is determined by means of a first detector device and the intensity of the light of the second polarisation state that was reflected by the sample material is determined by means of a second detector device.

It is thus also possible that the apparatus comprises a first detector device for determining the first intensity of the light in the first polarisation state that was reflected by the sample material and a second detector device for determining the second intensity of the light in the second polarisation state that was reflected by the sample material.

Preferably, the at least one detector device, in particular the first and/or the second detector device, is a photodetector selected from the group of: photocell, photomultiplier, microchannel plate photomultiplier, CMOS sensor, CCD sensor, photodiode, phototransistor, photoresistor, and/or thermal radiation meter, in particular bolometer, pyroelectric sensor, pyrometer, thermocouple and/or Golay cell. Especially with low light to be detected and high temporal resolutions, photomultipliers or photodiodes, such as an HgCdTe photodiode, are preferably used.

Furthermore, it is possible that the at least one detector device, in particular that the first and/or the second detector device, is a synchronous detector (lock-in). This makes it possible to further improve the noise suppression or to further filter the noise.

It is useful if the method further comprises the following step, in particular which is carried out before steps a) and b): —irradiating light onto the sample material through a reflection element in such a way that the light is reflected, in particular totally reflected, at the interface formed by the sample material and the reflection element.

Preferably, the light reflected by the sample material, in particular in the first and/or the second polarisation state, is the light reflected, in particular totally reflected, at the interface formed by the sample material and the reflection element. It is thus advantageous if the light reflected at the interface formed by the sample material and the reflection element is the light reflected by the sample material, in particular in the first and/or the second polarisation state. It is thus advantageous if the light reflected by the sample material corresponds to or is identical to the light reflected at the interface formed by the sample material and the reflection element.

Preferably, the light is irradiated onto the sample material through the reflection element in such a way that an electromagnetic wave is formed on the surface of the reflection element and penetrates into the sample material, in particular with the field strength of the electromagnetic wave decreasing exponentially. Preferably, the electromagnetic wave at the surface of the reflection element, in particular the field strength of which decreases exponentially, is a so-called decaying (evanescent) wave, which preferably arises in the case of total internal reflection at the interface formed by the sample material and the reflection element.

It is thus possible that, especially within the reflection element, the angle ($\alpha$) at which the light is irradiated onto the sample material is equal to the angle ($\beta$) at which the light is reflected by the sample material.

Here it is possible that, in particular within the reflection element, the angle ($\alpha$) at which the light is irradiated onto the sample material and the angle ($\beta$) at which the light is reflected by the sample material is between 0° and 90°, preferably between 10° and 85°.

It is also advantageous if the refractive index of the reflection element ($n_1$) is greater than the refractive index of the sample material ($n_2$).

It is thus possible that the refractive index of the reflection element ($n_1$) is between 2.0 and 4.0, preferably between 2.4 and 2.6, and/or that the refractive index of the sample material ($n_2$) is between 1.05 and 1.95, preferably between 1.25 and 1.75.

Furthermore, it is expedient if the angle ($\alpha$) is greater than or equal to the angle for which total internal reflection occurs at the interface formed by the sample material and the reflection element, in particular for the light irradiated onto the sample material.

In particular, the limit angle ($\theta_c$) above which total reflection occurs is calculated as follows:

$$\theta_c = \arcsin(n_2/n_1).$$

The limit angle ($\theta_c$) is also referred to here in particular as the critical angle. From the critical angle ($\theta_c$), the electromagnetic wave, in particular the radiated light, can preferably no longer (or no longer predominantly) penetrate the optically thinner medium, in particular the sample material, and is instead reflected (in particular almost completely), in particular totally reflected, at the interface between the optically denser and the optically thinner medium, in particular at the interface formed by the sample material and the reflection element. In particular, the angle of reflection is equal to the angle of incidence.

It is thus possible that the light irradiated onto the sample material is not capable of propagation in the sample material, in particular due to the angle ($\alpha$) at which the light is irradiated onto the sample material.

Advantageously, the reflection element is an optical waveguide, in particular an optical waveguide in which light is guided due to total internal reflection. For example, such an optical waveguide is a prism or a fibre, in particular without a casing.

Preferably, the reflection element is an ATR element, in particular an ATR crystal.

It is thus possible that the reflection element, preferably the ATR element, further preferably the ATR crystal, comprises zinc selenide (ZnSe), germanium (Ge), thallium bromide iodide (KRS-5), silicon (Si), AMTIR (amorphous material transmitting infrared radiation), in particular AMTIR-1 (GeAsSe), and/or diamond. Such materials are preferably suitable for light from the infrared wavelength range.

Furthermore, it is also conceivable that, in particular in FEWS infrared spectroscopy methods and/or in an FEWS infrared spectrometer, the ATR element comprises chalcogenide glass fibres.

Furthermore, it is expedient if the light irradiated onto the sample material is unpolarised light, preferably if the light irradiated onto the sample material has a polarisation below 45° to the plane of incidence. In particular, this achieves uniform excitation in perpendicular and parallel polarisation.

Advantageously, the light irradiated onto the sample material is light from the infrared wavelength range, preferably from the near- and/or the mid- and/or the far-infrared range, further preferably light from the wavelength range between 0.8 µm and 1000 µm, still further preferably light from the wavelength range between 2.5 µm and 25 µm, even further preferably light from the wavelength range between 8 µm and 12 µm.

It is expedient that the light irradiated onto the sample material is emitted by a light source, in particular wherein the light source is selected from the group of: laser, preferably semiconductor laser, further preferably quantum cascade laser (QCL), and/or thermal emitter, preferably incandescent lamp, Nernst lamp, resistance heating elements made of silicon carbide or carbon arc lamp. In this regard, it is also possible to use other light sources. In particular, the method and/or the apparatus for determining optical properties of a sample material is not subject to any restriction with regard to the light sources used.

It is also expedient if the apparatus further comprises one of the following units: —a light source, in particular for irradiating light onto the sample material through a reflection element in such a way that the light is reflected, in particular totally reflected, at an interface formed by the sample material and the reflection element; —a reflection element, preferably an ATR element, further preferably an ATR crystal, in particular wherein the sample material forms an interface with the reflection element; a fixing unit for fixing the sample material on the reflection element; —one or more optical waveguides, preferably one or more fibres, further preferably one or more glass fibres, in particular for guiding, region by region, the light irradiated onto the sample material and/or the light reflected by the sample material; —one or more mirrors, in particular for deflecting the light; —at least one optical sump; —one or more wavelength selectors, preferably one or more monochromators, in particular for spectrally isolating a predetermined wavelength, preferably of the light irradiated onto the sample material.

It is also possible if the light irradiated onto the sample material and/or the light reflected by the sample material, in particular in the first and/or the second polarisation state, is a light beam, preferably wherein the light beam has a beam diameter between 10 µm and 10,000 µm at least in some regions.

Furthermore, it is also possible that the light irradiated onto the sample material and/or the light reflected by the sample material, in particular in the first and/or the second polarisation state, is guided at least in some regions in an optical waveguide, preferably in a fibre, still further preferably in a glass fibre.

It is advantageous if, in step c), due to the forming of the ratio of the first intensity and the second intensity, or vice versa, the effects of the intensity noise of the light source, in particular on the measurement result, are reduced, preferably eliminated.

It is thus possible that the effects of the intensity noise of the light source, in particular on the measurement result, are reduced by at least a factor of 2.5, preferably by a factor of 5, further preferably by a factor of 10, still further preferably by a factor of 50, even further preferably by a factor of 100.

It is also expedient if at least steps a) to c) are carried out for light from the infrared wavelength range, preferably from the near- and/or the mid- and/or the far-infrared range, further preferably for light from the wavelength range between 0.8 μm and 1000 μm, still further preferably for light from the wavelength range between 2.5 μm and 25 μm, even further preferably for light from the wavelength range between 8 μm and 12 μm.

It is further preferred that the light paths in step a) and b) are substantially identical, in particular for the light in the first and the second polarisation state that was reflected by the sample material. It is thus also possible that the light paths in step a) and b) are identical, in particular for the light in the first and the second polarisation state that was reflected by the sample material. In particular, this ensures that fluctuations have the same effect on both measurement paths.

It is further possible that the light paths in step a) and b) differ by less than 10 mm, preferably by less than 1 mm. In particular, such small differences in the light paths arise due to the measurement assembly with a first and a second detector device, so that small differences in the light paths may arise, especially at the end of the measurement path.

Preferably, steps a) and b) are carried out simultaneously, in particular the intensities of the light in the first and the second polarisation states that was reflected by the sample material are determined simultaneously. This makes it possible, in particular, to eliminate the need for an additional reference measurement. Furthermore, an exact measurement result is achieved, as possible differences between the signals, which may occur due to temporally staggered measurements, are eliminated.

Preferably, the method further comprises the step of:
d) determining at least one optical property of the sample material based on the ratio formed.

The computing unit is preferably set up to form a ratio of the first intensity and the second intensity, or vice versa.

In a preferred variant, one or more of the above steps, in particular at least steps a), b), c) and preferably d), are carried out or repeated for a plurality of wavelengths, in particular for light from the infrared wavelength range, preferably from the near- and/or the mid- and/or the far-infrared range, further preferably for light from the wavelength range between 0.8 μm and 1000 μm, still further preferably for light from the wavelength range between 2.5 μm and 25 μm, even further preferably for light from the wavelength range between 8 μm and 12 μm. It is also possible that, in step d), after repeating steps a) to c) for the plurality of wavelengths, the determination of at least one optical property of the sample material is performed based on the (plurality of) ratios formed for the plurality of ratios.

Furthermore, it is possible to use the method described above, in particular according to any one of claims 1 to 12, and/or the apparatus described above, in particular according to any one of claims 13 to 15, for the spectral analysis, in particular of the sample material. Preferably, the spectral analysis, in particular of the sample material, is based on total internal reflection, preferably frustrated total internal reflection.

It is thus also possible that the method described above, in particular according to any one of claims 1 to 12, and/or the apparatus described above, in particular according to any one of claims 13 to 15, is used for suppressing the intensity noise of light sources, in particular in spectral analysis.

BRIEF DESCRIPTION OF THE DRAWINGS

In the following, exemplary embodiments of the invention are explained with the aid of the accompanying FIGS. 2 to 7, which are not to scale.

FIG. 3a schematically shows an enlarged detail of FIG. 2a;

FIG. 3b schematically shows an enlarged detail of FIG. 3a;

DETAILED DESCRIPTION OF THE INVENTION

Figure 1:
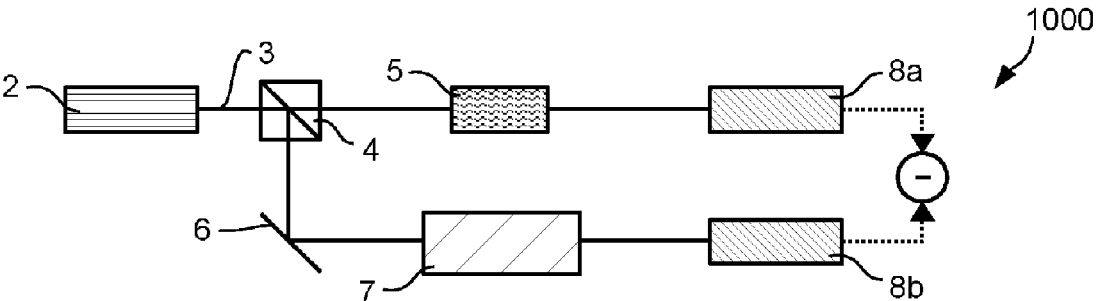
FIG. 1 schematically shows a known measurement assembly in plan view.

FIG. 1 shows schematically a plan view of a measurement assembly 1000 known from the prior art. Preferably, the optical properties of a sample material 5 are determined by means of the measurement assembly 1000.

As shown in FIG. 1, the measurement assembly 1000 comprises a light source 2, a beam splitter 4, the sample material 5, a mirror 6, a variable attenuator 7 and two detectors 8a and 8b.

In particular, thermal emitters filtered with a monochromator for wavelength selection are used as light source 2. However, thermal emitters have the particular disadvantage that they have a low spectral power density and therefore a low intensity with narrowband filtering. Alternatively, laser sources such as quantum cascade lasers are also used as light source 2. Although these represent very powerful light sources in the mid- and far-infrared wavelength range in particular, they have a high intensity noise compared to thermal emitters, and therefore the sensitivity is reduced in particular for sample material 5 with low concentrations of the substance to be examined, and these can therefore no longer be measured. Also, the power density of such light sources 2 is not constant over the wavelength, and therefore the measured spectrum should advantageously be compared with a reference measurement, especially without or with known sample material 5.

For this purpose, as shown in FIG. 1, an additional optical path is preferably integrated into the measurement assembly according to the prior art, so that the reference measurement can be simultaneously detected directly by the additional optical path and can be subtracted from the measurement signal (balanced detection). For this purpose, as shown in FIG. 1, the light 3 in particular is split with the aid of the beam splitter 4 and directed into the reference path and the measurement path. In order to obtain an attenuation that is as identical as possible in the measurement path and in the reference path, the reference path in the prior art preferably comprises a variable attenuator 7. Then, advantageously, the measurement signal and the reference signal are detected in the detectors 8a and 8b, which are, for example, photomultipliers, and subtracted from each other. However, the disadvantage of such an additional reference path is that it could also have a wave-dependent transmission and is also subject to other fluctuations, like the measurement path. The reference path should also preferably have an attenuation similar to the measurement path, but this can usually only be achieved roughly by means of the variable attenuator 7, since the sample material 5 is unknown.

In the following, preferred exemplary embodiments of the invention are explained by way of example with the aid of the accompanying FIGS. 2 to 7, which are not true to scale, in particular which avoid the disadvantages of the prior art, and which advantageously reduce or suppress and/or eliminate the effects of the intensity noise of light sources.

Figure 2A:
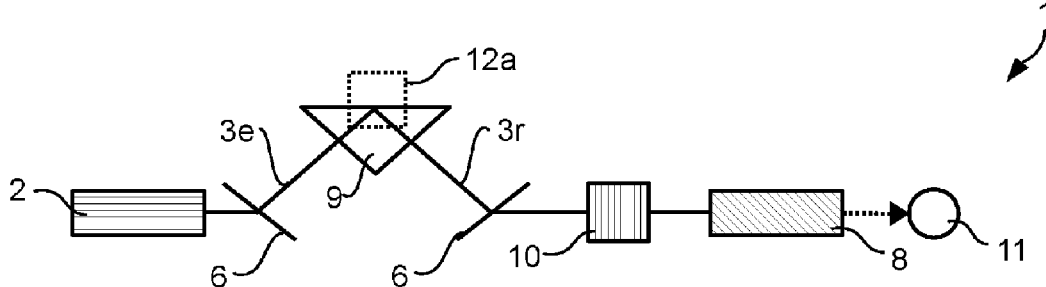
FIG. 2a and FIG. 2b schematically show an apparatus in side view and in plan view.
Figure 2B:
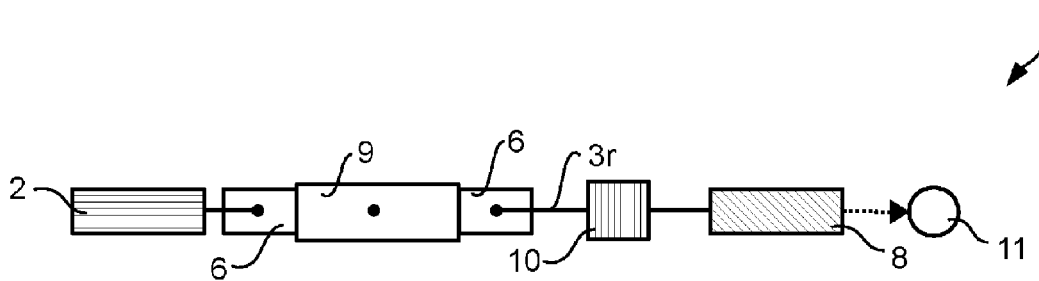

FIG. 2a and FIG. 2b schematically show an apparatus 1 in side view and plan view.

As shown in FIG. 2a and in FIG. 2b, the apparatus 1 comprises a light source 2, mirrors 6, a reflection element 9, at least one polariser 10 and at least one detector device 8 as well as a computing unit 11.

The apparatus shown in FIG. 2a and FIG. 2b, preferably a spectrometer, further preferably an ATR infrared spectrometer, for determining optical properties of the sample material 5, in this case comprises: —at least one detector device 8 for determining a first intensity of light 3r in a first polarisation state that was reflected by the sample material 5 and for determining a second intensity of light 3r in a second polarisation state that was reflected by the sample material 5; —at least one computing unit 11 for forming the ratio of the first intensity and the second intensity, or vice versa.

Preferably, the light source 2 is selected from the group of: laser, preferably semiconductor laser, further preferably quantum cascade laser (QCL), and/or thermal emitter, preferably incandescent lamp, Nernst lamp, heating element made of silicon carbide or carbon arc lamp. Preferably, the light source emits light from the infrared wavelength range, preferably from the near- and/or mid- and/or far-infrared range, further preferably light from the wavelength range between 0.8 µm and 1000 µm, still further preferably light from the wavelength range between 2.5 µm and 25 µm, even further preferably light from the wavelength range between 8 µm and 12 µm.

The light source 2 shown in FIG. 2a and FIG. 2b is, for example, a quantum cascade laser that emits light from the wavelength range between 8 µm and 12 µm.

As shown in FIG. 2a and FIG. 2b, in particular, the light emitted by the light source 2 is irradiated onto a sample material arranged on the reflection element 9. For the sake of clarity, the sample material is not shown here. To irradiate the sample material, the light emitted by the light source 2 is deflected, in particular with the aid of the mirror 6. Furthermore, the light 3e irradiated onto the sample material by the reflection element 9 is preferably irradiated in such a way that the light is reflected, in particular totally reflected, at the interface formed by the sample material and the reflection element 9. Preferably, the light reflected, in particular totally reflected, at the interface formed by the sample material 5 and the reflection element 9 is the light 3r reflected by the sample material 5. With regard to the reflection at the interface formed by the sample material and the reflection element 9, please refer to the explanations provided below in the context of FIG. 3a and FIG. 3b.

The light 3r reflected by the sample material is then directed to at least one polariser 10 by means of another mirror 6, as also shown in FIG. 2a and FIG. 2b.

By means of the polariser 10, the light 3r reflected by the sample material is preferably split into the first polarisation state and the second polarisation state.

Advantageously, the polariser 10 is selected from the group of: polarisers based on birefringence, preferably polarisation prism, further preferably Nicol prism, Rochon prism, Glan-Thomson prism, polariser based on dichroism, preferably J-film and/or H-film, and/or polariser based on reflection, preferably Brewster window.

Here, it is advantageous if the first and second polarisation states differ, in particular if the first and second polarisation states are linearly polarised states with mutually perpendicular oscillation planes, wherein preferably the first polarisation state is parallel polarised light and the second polarisation state is perpendicular polarised light.

The polariser 10 shown in FIG. 2a and FIG. 2b is, for example, a linear polariser, in particular which can sequentially filter out light from two linearly polarised states with mutually perpendicular oscillation planes as a function of a controllable state.

Subsequently, in particular the intensity of the light 3r in the first polarisation state that was reflected by sample material and the intensity of the light 3r of the second polarisation state that was reflected by the sample material are determined by means of the detector device 8, as shown in FIG. 2a and in FIG. 2b.

Preferably, the detector device 8 is a photodetector selected from the group of: photocell, photomultiplier, microchannel plate photomultiplier, CMOS sensor, CCD sensor, photodiode, phototransistor, photoresistor, bolometer, pyroelectric sensor, pyrometer, thermocouple and/or Golay cell. The detector device 8 shown in FIG. 2a and FIG. 2b is, for example, a photomultiplier.

In the computing unit 11 shown in FIG. 2a and FIG. 2b, the ratio of the intensity of the light 3r in the first polarisation state that was reflected by the sample material and the intensity of the light 3r in the second polarisation state that was reflected by the sample material is then formed.

Preferably, this is done for a variety of wavelengths, especially for light from the infrared wavelength range, preferably from the near- and/or mid- and/or far-infrared range, further preferably for light from the wavelength range between 0.8 µm and 1000 µm, still further preferably for light from the wavelength range between 2.5 µm and 25 µm, even further preferably for light from the wavelength range between 8 µm and 12 µm.

The apparatus 1 shown in FIG. 2a and FIG. 2b determines here, in particular depending on the controllable state of the polariser 10, for example, first the intensity of the light 3r in the first polarisation state that was reflected by the sample material and then the intensity of the light 3r of the second polarisation state that was reflected by the sample material. In particular, as soon as the intensities of the light 3r reflected by the sample material are determined for both polarisation states, the ratio of these intensities is formed by means of the computing unit 11. For this purpose, the computing unit 11 preferably has a (main) memory and/or a microprocessor. In other words, the apparatus 1 shown in FIG. 2a and FIG. 2b preferably operates sequentially, in particular depending on the controllable state of the polariser 10, which, for example, filters out or allows the passage of parallel polarised light in a first controllable state and filters out or allows the passage of perpendicular polarised light in a second controllable state.

As can be seen in FIG. 2a and FIG. 2b, in particular the light paths for determining the intensities for the light in the first and second polarisation states reflected by the sample material are identical.

In particular, due to the forming of the ratio of the intensities of the light 3r reflected by the sample material for both polarisation states, the effects of the intensity noise of the light source 2 are reduced, preferably eliminated.

For example, it is possible that the effects of the intensity noise of the light source 2 are reduced by at least a factor of 2.5, preferably by a factor of 5, further preferably by a factor of 10, still further preferably by a factor of 50, even further preferably by a factor of 100.

Furthermore, it is also possible that the light 3e irradiated onto the sample material and/or the light 3r reflected by the sample material, in particular in the first and/or the second polarisation state, is guided at least in some regions in an optical waveguide, preferably in a fibre, still further preferably in a glass fibre.

It is also possible that the light 3e irradiated onto the sample material and/or the light 3r reflected by the sample material, in particular in the first and/or the second polarisation state, is guided in a freely radiating manner at least in some regions.

It is also possible that the light 3e irradiated onto the sample material 5 and/or the light 3r reflected by the sample material 5, in particular in the first and/or the second polarisation state, is a light beam, preferably wherein the light beam has a beam diameter between 10 μm and 10,000 μm at least in some regions.

Figure 3A:
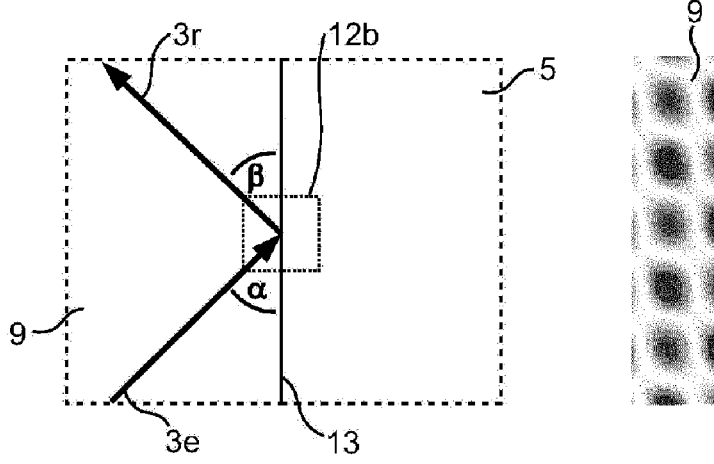

FIG. 3a schematically shows an enlarged detail 12a of FIG. 2a.

As shown in FIG. 3a, light 3e is preferably irradiated through the reflection element 9 onto the sample material 5 in such a way that the light 3r is reflected, in particular totally reflected, at the interface 13 formed by the sample material 5 and the reflection element 9.

Here, as shown in FIG. 3a, in particular within the reflection element 9, the angle (α) at which the light 3e is irradiated onto the sample material 5 is equal to the angle (β) at which the light 3r is reflected by the sample material 5.

For example, it is possible that, in particular within the reflection element 9, the angle (α) at which the light 3e is irradiated onto the sample material 5 and the angle (β) at which the light 3r is reflected by the sample material 5 is between 0° and 90°, preferably between 10° and 80°. For example, the angles (α) and (β) shown in FIG. 3a are equal to 32°.

Advantageously, the refractive index of the reflection element 9 ($n_1$) is greater than the refractive index of the sample material 5 ($n_2$). It is thus possible that the refractive index of the reflection element 9 ($n_1$) is between 2.0 and 4.0, preferably between 2.4 and 2.6, and/or that the refractive index of the sample material 5 ($n_2$) is between 1.05 and 1.95, preferably between 1.25 and 1.75. For example, the sample element 5 shown in FIG. 3a has a refractive index ($n_2$) of 1.33 and the reflection element 9 shown in FIG. 3a has a refractive index ($n_1$) of 2.59 at a wavelength of 633 nm. Preferably, in the method and in the apparatus 1, the dependency of the refractive index of the entire measurement assembly, in particular the dependency of the refractive index of the sample material 5 and of the reflection element 9, on the wavelength is negligible.

It is thus expedient if the angle (α) is greater than or equal to the angle for which total internal reflection occurs at the interface 13 formed by the sample material 5 and the reflection element 9, in particular for the light 3e irradiated onto the sample material 5.

In particular, the limit angle ($\theta_c$) above which total internal reflection occurs is calculated as follows:

$$\theta_c = \arcsin(n_2/n_1).$$

The limit angle ($\theta_c$) is also referred to here in particular as the critical angle. From the critical angle ($\theta_c$) onwards, the electromagnetic wave, in particular the radiated light 3e, can preferably no longer (or almost no longer) penetrate the optically thinner medium, in particular the sample material 5, and is instead completely reflected at the interface between the optically denser and the optically thinner medium, in particular at the interface 13 formed by the sample material 5 and the reflection element 9. In particular, the angle of reflection is equal to the angle of incidence.

It is thus possible that the light 3e irradiated onto the sample material 5 is not capable of propagating in the sample material 5, in particular due to the angle (α) at which the light is irradiated onto the sample material 5.

Advantageously, the reflection element 9 is an optical waveguide, in particular an optical waveguide in which light is guided due to total internal reflection. For example, such an optical waveguide is a prism or a fibre, in particular without a casing.

Preferably, the reflection element 9 is an ATR element, in particular an ATR crystal.

It is thus possible that the reflection element 9, preferably the ATR element, further preferably the ATR crystal, comprises zinc selenide (ZnSe), germanium (Ge), thallium bromide iodide (KRS-5), silicon (Si), AMTIR (amorphous material transmitting infrared radiation), in particular AMTIR-1 (GeAsSe), and/or diamond.

Furthermore, it is also conceivable that, in particular in FEWS infrared spectroscopy methods and/or in an FEWS infrared spectrometer, the ATR element comprises chalcogenide glass fibres.

Furthermore, it is expedient if the light 3e irradiated onto the sample material 5 is unpolarised light, preferably if the light 3e irradiated onto the sample material 5 has a polarisation below 45° to the plane of incidence.

Figure 3B:
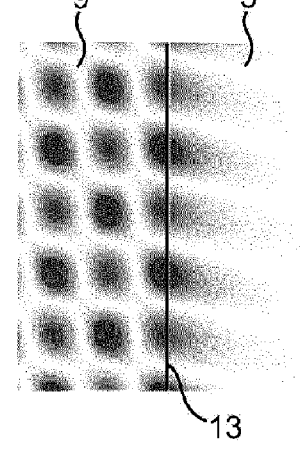

FIG. 3b schematically shows an enlarged detail 12b of FIG. 3a.

As shown in FIG. 3b, the light is preferably irradiated onto the sample material 5 through the reflection element 9 in such a way that an electromagnetic wave is formed on the surface of the reflection element 9 and penetrates into the sample material 5, in particular wherein the field strength of the electromagnetic wave decreases exponentially. Preferably, the electromagnetic wave at the surface of the reflection element 9, in particular the field strength of which decreases exponentially, is a so-called decaying (evanescent) wave, which preferably arises upon total internal reflection at the interface 13 formed by the sample material 5 and the reflection element 9. In particular, if the sample material 5 now absorbs light, the reflection of the light beam, in particular of the light 3r reflected at the interface 13 formed by the sample material 5 and the reflection element 9, is weaker, since the decaying (evanescent) wave, in particular the evanescent field, experiences losses due to the sample material 5. Thus, an exemplary distribution of the field strength in front of and behind the interface 13 formed by the sample material 5 and the reflection element 9 is shown in FIG. 3b, in particular for an incident plane wave. As can be seen in FIG. 3b, the field strength in the sample material 5 decreases exponentially.

Figure 4A:
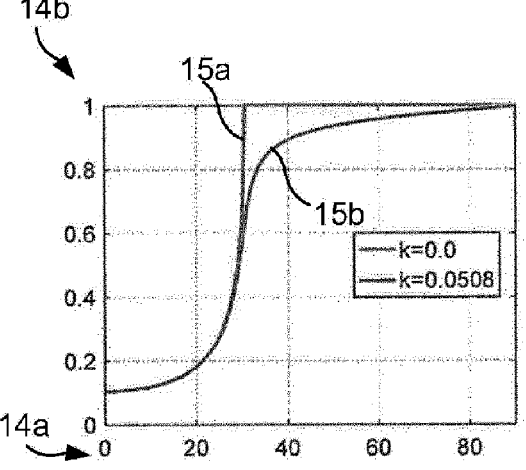
FIG. 4a to FIG. 4c show graphs.
Figure 4B:
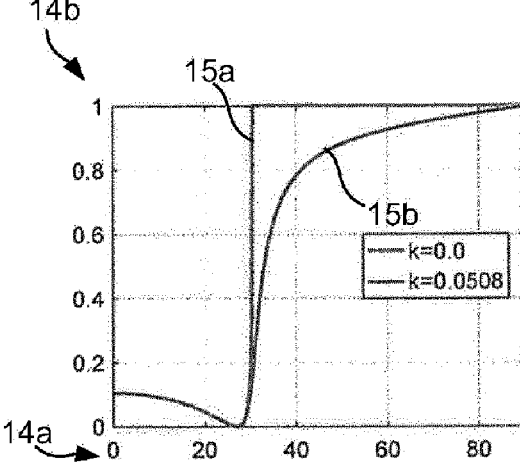
Figure 4C:
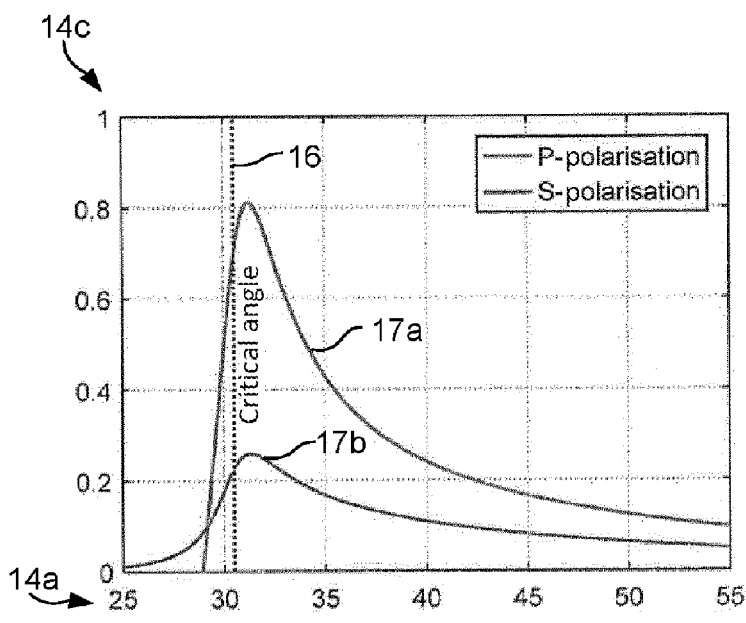

FIG. 4a to FIG. 4c show graphs.

FIG. 4a and FIG. 4b show examples of the reflection at an interface between a reflection element made of ZnSe ($n_1$=2.59) and the sample material water ($n_2$=1.33) for the perpendicular polarisation in FIG. 4a and for the parallel polarisation in FIG. 4b, in each case for the loss-free case 15a and the lossy case 15b, in particular wherein the extinction coefficient (k) for the lossy case is k=0.0508. The graph axes 14a show in each case the angle of incidence in degrees, and the graph axes 14b show the reflectivity for perpendicular polarisation in FIG. 4a and for parallel polarisation in FIG. 4b. The graph curves 15a and 15b were calculated for the wavelength of 10 μm by way of example, since water strongly absorbs light in this wavelength range. As can be seen in particular from FIG. 4a and FIG. 4b, at an angle which is greater than the critical angle of total internal reflection, the attenuation for parallel polarised light is greater than the attenuation for perpendicular polarised light. Furthermore, both polarisation directions also have, in particular, a different phase offset (not shown here).

As can already be seen in FIG. 4a and FIG. 4b, the extinction coefficient of the sample material in particular has a greater influence on the reflection for parallel polarised light than for perpendicular polarised light. Thus, it can be expected in particular that a change in the extinction coefficient has a greater effect on the reflection of parallel polarised light at the reflection element than on the reflection of perpendicular polarised light. To confirm this dependency in particular, the relative change in the reflection at the reflection element is determined below as a function of a relative change in the extinction coefficient of the sample material. In particular, the change in the extinction coefficient (k) is defined as follows:

$$\Delta k = k_0 \cdot \epsilon \text{ for } \epsilon \ll 1.$$

In particular, the changes in reflection are defined as follows:

$$\Delta R = R(k_g) - R(k_0 + \Delta k) = R(k_0) - R(k_0(1+\epsilon)).$$

Further, the relative change in reflection is defined as:

$$R_{rel} = \Delta R / R(k_0).$$

FIG. 4c shows in particular this polarisation dependency of the relative change of the reflection for parallel polarised light 17a and perpendicular polarised light 17b at the reflection element, wherein in particular the graph axis 14a shows the angle of incidence to the perpendicular on the interface in degrees and the graph axis 14c shows the relative change of the reflection at the reflection element. As can be seen in particular from FIG. 4c, the influence of the extinction coefficient is stronger the closer the angle of incidence, in particular the angle ($\alpha$) at which the light is incident on the sample material, is to the critical angle 16 of the total internal reflection. Furthermore, it can be seen from FIG. 4c that in particular a variation of the extinction coefficient for the different polarisations of the light leads to different relative changes in the reflection. If the ratio between the reflection coefficients of both polarisations is now preferably formed, a dependency on the extinction coefficient remains. This forming of the ratio is used in the method and apparatus for determining optical properties of a sample material, as explained above. In particular, it is possible that some signal intensity is lost due to the forming of the ratio, preferably because there is a dependency on the extinction coefficient in both polarisation states, but overall a signal is retained, preferably with the effects of the intensity noise of the light source and/or fluctuations of the measurement assembly being reduced or eliminated as explained above.

It should be noted in particular here that this dependency also exists advantageously for polarisation states other than the parallel and the perpendicular polarisation. However, the maximum difference between the polarisations becomes smaller in particular for other polarisation states, so that preferably consequently signal strength is lost for other polarisations. In other words, in particular, the distance of the maximum relative change in reflection becomes smaller for polarisation states other than those shown in FIG. 4c, while preferably maintaining the dependency in principle. Furthermore, it can also be seen from FIG. 4c in particular that the polarisation dependency of the relative changes of the reflection at the reflection element have an angular dependency, but the angular adjustment is advantageously possible in a relatively large angular range, the angular range preferably being between 0° and 5°, further preferably between 0.5° and 3°, above the critical angle of the total internal reflection.

It should be noted here that it is also possible, for example, that the sample material 5 is liquid and/or solid. It is thus possible that the sample material 5 comprises, for example, water, bacteria and/or solids. Furthermore, it is conceivable that the sample material 5 comprises one or more substances selected from the group of: water, bacteria, viruses, solids, solvents, solvent mixtures, lacquer layers, polymer films, thermosets, body fluids, in particular blood, unicellular or multicellular organisms, fungi, plants, in particular algae.

Figure 5A:
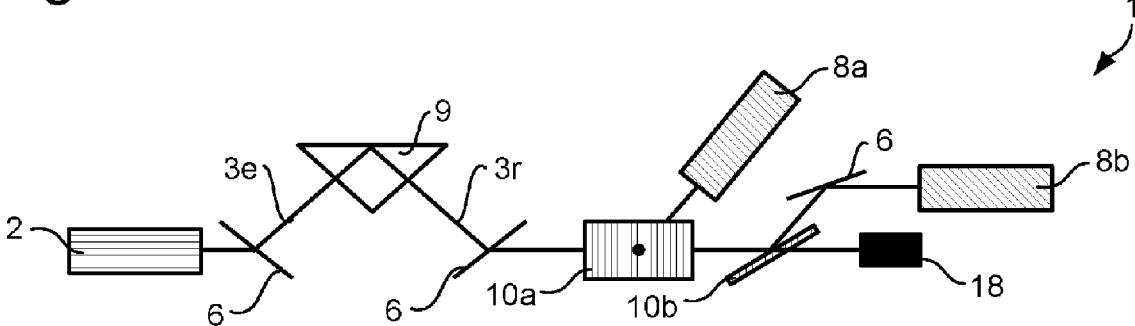
FIG. 5a to FIG. 5c schematically show apparatuses in side view and plan view.
Figure 5B:
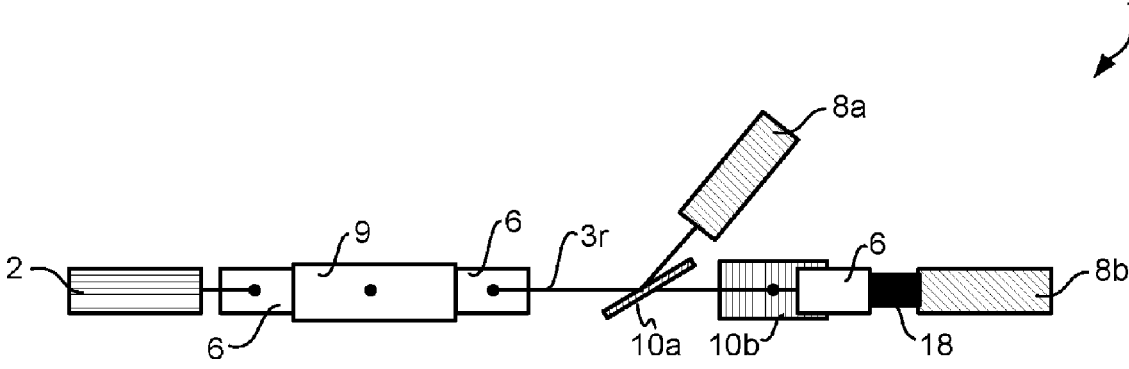
Figure 5C:
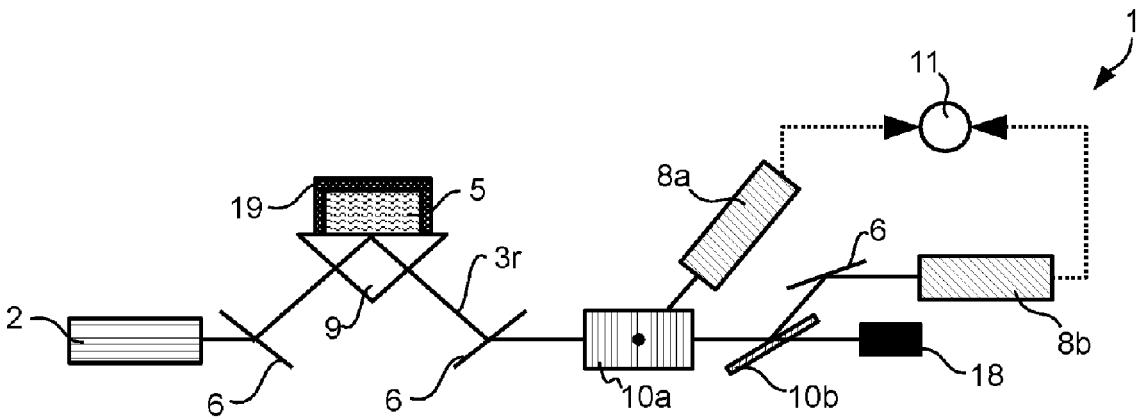

FIG. 5a to FIG. 5c schematically show apparatuses 1 in side view and plan view.

The apparatus 1 shown in FIG. 5a and in FIG. 5b comprises a light source 2, mirrors 6, a reflection element 9, polarisers 10a and 10b and detector devices 8a and 8b and an optical sump 18.

By means of the apparatus 1 shown in FIG. 5a and FIG. 5b, it is possible to carry out a method, preferably a spectroscopy method, further preferably an ATR infrared spectroscopy method, for determining optical properties of a sample material, in particular wherein the method comprises the following steps: a) determining a first intensity of light 3r in a first polarisation state that was reflected by the sample material; b) determining a second intensity of light 3r in a second polarisation state that was reflected by the sample material; c) forming the ratio of the first intensity and the second intensity, or vice versa. For the sake of clarity, FIG. 5a and FIG. 5b also do not show the sample material which is applied to the reflection element 9, in particular in direct contact.

It is further possible that the apparatus 1 is preferably a spectrometer, further preferably an ATR infrared spectrometer, an HATR infrared spectrometer, an FEWS infrared spectrometer and/or an FTIR infrared spectrometer.

With regard to the design of the light source 2, the reflection element 9 and the detector devices 8a and 8b, reference is made here in particular to the above explanations. The apparatus 1 shown in FIGS. 5a and 5b corresponds substantially to the apparatus shown in FIGS. 2a and 2b with the difference that the apparatus comprises the polarisers 10a and 10b instead of the polariser 10 and the detector devices 8a and 8b instead of the detector device 8. Furthermore, the apparatus shown in FIGS. 5a and 5b also comprises the optical sump 18.

As shown in FIGS. 5a and 5b, the light 3r reflected by the reflection element 9 and/or the sample material 5, in particular the light 3r reflected at the interface formed by the sample material 5 and the reflection element 9, is preferably separated into the first and second polarisation states by means of the polarisers 10a and 10b. Preferably, the polarisers are Brewster windows.

Advantageously, the Brewster window 10a reflects the perpendicular polarisation and the Brewster window 10b reflects the parallel polarisation, or vice versa. The other polarisations are advantageously transmitted through the Brewster windows 10a and 10b and enter the optical sump 18, in particular the latter ensuring that they do not interfere with the measurement result. Further, as shown in FIGS. 5a and 5b, the intensities of the two polarisation states, in particular the first and/or the second polarisation state, are subsequently determined by means of the detector devices 8a and 8b. Thus, the apparatus 1 shown in FIGS. 5a and 5b comprises the detector device 8a for determining the intensity of the light 3r in the first polarisation state that was reflected by the sample material and the detector device 8b for determining the intensity of the light 3r of the second polarisation state that was reflected by the sample material.

Subsequently, it is possible to form the ratio of the intensities of the light 3r that was reflected by the sample material in the first polarisation state and in the second polarisation state, in particular referring to the above explanations in this respect.

In particular, for further noise reduction, it is possible that at least one detector device 8a and/or 8b is a synchronous detector (lock in).

By means of the apparatus 1 shown in FIGS. 5a and 5b, it is possible, for example, to simultaneously determine the intensity of the light reflected by the sample material, in particular the light 3r reflected at the interface formed by the sample material and the reflection element 9, in the first and the second polarisation state. In particular, due to the two detector devices, a simultaneous detection of the two polarisations is possible, in particular wherein the sample material is excited uniformly, in particular with light of a polarisation below 45° to the plane of incidence.

Furthermore, it is preferred that the light paths for the light 3r in the first and the second polarisation state that was reflected by the sample material are substantially identical. Preferably, the light paths differ by less than 10 mm, preferably by less than 1 mm.

The apparatus 1 shown in FIG. 5c corresponds to the apparatus 1 shown in FIGS. 5a and 5b with the difference that, on the one hand, the sample material 5 is shown by way of example, wherein preferably the sample material 5 is fixed by means of a fixing unit 19 in such a way that the sample material 5 is directly placed or arranged on or against the reflection element 9. Preferably, no further material, such as air, is arranged between the sample material 5 and the reflection element 9. Furthermore, FIG. 5c also shows a computing unit 11 for forming ratios of the intensities of the light 3r reflected by the sample material in the first and the second polarisation state. With regard to the design of these and the other elements shown in FIG. 5c, please refer to the above explanations.

Thus, as shown in FIG. 5c, it is possible for the apparatus 1 to comprise one of the following units: —a light source 2, in particular for irradiating light onto the sample material 5 through a reflection element 9 in such a way that the light is reflected, in particular totally reflected, at an interface formed by the sample material 5 and the reflection element 9; —a reflection element 9, preferably an ATR element, further preferably an ATR crystal, in particular wherein the sample material 5 forms an interface with the reflection element 9; —a fixing unit 19 for fixing the sample material 5 on the reflection element 9; —one or more mirrors 6, in particular for deflecting the light; —at least one optical sump 18.

It is further expedient if the apparatus 1 further comprises one of the following devices: —one or more optical waveguides, preferably one or more fibres, further preferably one or more glass fibres, in particular for guiding, region by region, the light irradiated onto the sample material 5 and/or the light 3r reflected by the sample material 5; —one or more wavelength selectors, preferably one or more monochromators, in particular for spectrally isolating a predetermined wavelength, preferably of the light irradiated onto the sample material 5.

Figure 6:
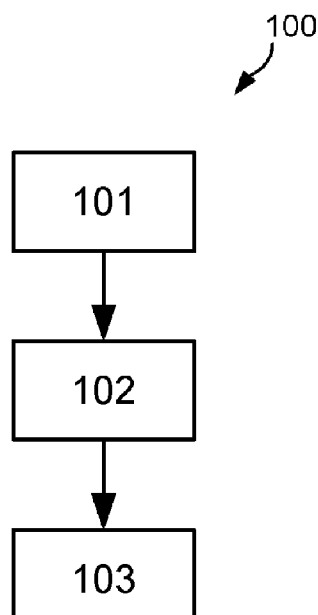
FIG. 6 and FIG. 7 schematically show method steps for determining optical properties of a sample material.
Figure 7:
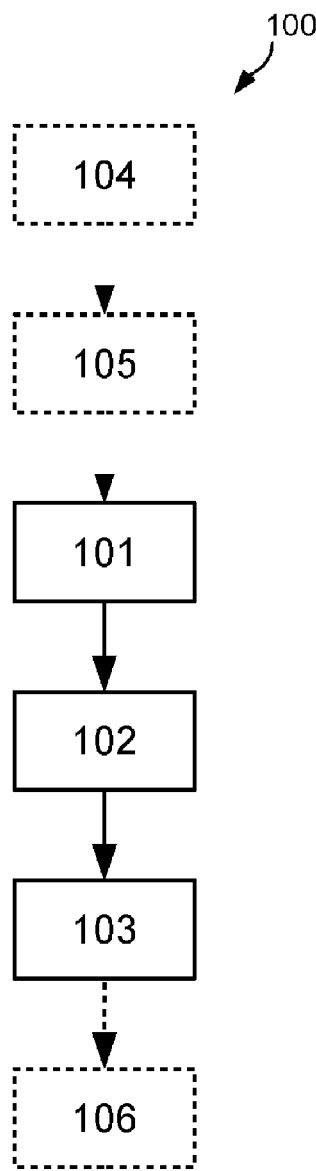

FIG. 6 and FIG. 7 schematically show method steps for determining optical properties of a sample material.

FIG. 6 schematically shows a flow graph of a method 100 comprising the method steps 101, 102 and 103 for determining optical properties of a sample material. Preferably, the method 100 performed in FIG. 6 is a spectroscopy method, further preferably an ATR infrared spectroscopy method. It is also possible that the method is an HAIR infrared spectroscopy method, an FEWS infrared spectroscopy method and/or an FTIR infrared spectroscopy method.

In step 101, determining a first intensity of light in a first polarisation state that was reflected by the sample material. In step 102, determining a second intensity of light in a second polarisation state that was reflected by the sample material. In step 103, the ratio of the first intensity and the second intensity, or vice versa, is formed.

It is further advantageous if step 103 is performed after steps 101 and 102.

With regard to further possible embodiments of the method 100 shown in FIG. 6, reference is made here to the above explanations, in particular those also set out in conjunction with the apparatus explained above.

FIG. 7 schematically shows a flow chart comprising the method steps 101, 102, 103, 104, 105 and 106 for determining optical properties of a sample material. Steps 104, 105 and 106 are optional and therefore shown as dashed lines.

In the optional step 104, the irradiation of light onto the sample material by a reflection element takes place in such a way that the light is reflected, in particular totally reflected, at the interface formed by the sample material and the reflection element.

In the optional step 105, the light reflected by the sample material is then split into the first polarisation state and the second polarisation state, preferably by means of at least one polariser, further preferably by means of a first polariser and a second polariser.

Steps 101, 102 and 103 correspond to the steps shown in FIG. 6, and therefore reference is made to the above explanations in this respect.

It is advantageous if, in the step 103, due to the forming of the ratio of the first intensity and the second intensity, or vice versa, the effects of the intensity noise of the light source are reduced, preferably eliminated.

In the optional step 106, further method steps for further noise suppression, such as synchronous detection, can then take place.

Furthermore, it is possible to use the above-described method 100 and/or the above-described apparatus 1 for spectral analysis, in particular of the sample material. Preferably, the spectral analysis, in particular of the sample material, is based on total internal reflection, preferably frustrated total internal reflection, as explained above.

It is thus also possible that the above-described method 100 and/or the above-described apparatus 1 is used for suppressing the intensity noise of light sources, in particular in spectral analysis.

LIST OF REFERENCE SIGNS

1 Apparatus
2 Light source
3 Light, light beam
3e Radiated light
3r Reflected light
4 Beam splitter
5 Sample material
6 (Deflecting) mirror
7 Variable attenuator
8, 8a, 8b Detector device(s)
9 Reflection element 10, 10a, 10b Polariser(s)
11 Computing unit
12a, 12b Detail(s)
13 Interface
14a, 14b, 14c Graph axis/axes
15a, 15b Graph curve(s)
16 Critical angle
17a, 17b Graph curve(s)
18 Optical sump
19 Fixing unit
100 Method
101, 102, 103,
104, 105, 106 Method steps
1000 Measurement assembly

The invention claimed is:

1. An attenuated total reflection (ATR) infrared spectroscopy method for determining optical properties of a sample material, wherein the sample material is a liquid, the method comprising:

irradiating light onto the sample material through a reflection element in such a way that the light is totally reflected at an interface formed by the sample material and the reflection element, wherein the light irradiated onto the sample material is light from an infrared wavelength range, wherein the reflection element is an ATR element, and an angle at which the light is irradiated onto the sample material is greater than or equal to an angle for which total internal reflection occurs at the interface formed by the sample material and the reflection element for the light irradiated onto the sample material;

a) determining a first intensity of light reflected from the sample material in a first polarisation state;

b) determining a second intensity of the light reflected from the sample material in a second polarisation state;

c) forming a ratio of the first intensity and the second intensity, or vice versa;

d) determining at least one optical property of the sample material based on the ratio formed;

wherein the first polarisation state is parallel polarised light and the second polarisation state is perpendicular polarised light; and wherein the steps a), b), c) and d) are carried out for a plurality of wavelengths and wherein a spectral analysis of the sample material is performed.

2. The method according to claim 1, further comprising:

prior to a) and b), splitting the light reflected from the sample material into the first polarisation state and the second polarisation state.

3. The method according to claim 2, further comprising:

selecting the at least one polariser from the group of: polarisers based on birefringence, polarisers based on dichroism, and polarisers based on reflection.

4. The method according to claim 3, wherein:

the polarisers based on birefringence comprise polarisers based on polarisation prism, Nicol prism, Rochon prism, or Glan-Thomson prism;

the polarisers based on dichroism comprise film and/or H-film; and the polarisers based on reflection comprise Brewster window.

5. The method according to claim 1, wherein:

the first and second polarisation states differ.

6. The method according to claim 1, wherein:

irradiating the light onto the sample material through the reflection element in such a way that the light is reflected at the interface formed by the sample material and the reflection element is conducted prior to a) and b).

7. The method according to claim 6, wherein:

the light irradiated onto the sample material is emitted by a light source.

8. The method according to claim 7, wherein:

in c), due to forming the ratio of the first intensity and the second intensity, or vice versa, the effects of an intensity noise of the light source are reduced, or eliminated.

9. The method according to claim 7, wherein:

the laser comprises a semiconductor laser, or a quantum cascade laser (QCL); and a thermal emitter comprises an incandescent lamp, Nernst lamp, or resistance heating elements made of silicon carbide or carbon arc lamp.

10. The method according to claim 1, wherein:

in a) and b), the light reflected from the sample material in the first and in the second polarisation state are substantially identical.

11. The method according to claim 1, wherein:

a) and b) are carried out simultaneously.

12. The method according to claim 1, further comprising:

prior to a) and b), splitting the light reflected from the sample material into the first polarisation state and the second polarisation state using at least one polariser, or a first polariser and a second polariser.

13. The method according to claim 1, wherein:

the light irradiated onto the sample material is light from the wavelength range between 0.8 μm and 1000 μm, or between 2.5 μm and 25 μm, or between 8 μm and 12 μm.

14. The method according to claim 1, wherein a refractive index of the ATR element is between 2.0 and 4.0.

15. An apparatus for determining optical properties of a sample material, wherein the apparatus is an attenuated total reflection (ATR) infrared spectrometer and the sample material is a liquid, the apparatus comprising:

a reflection element, wherein the reflection element is an ATR element, and a fixing unit for fixing the sample material on the reflection element such that the sample material is directly arranged on or against the reflection element;

a light source for irradiating light from the infrared wavelength range onto the sample material through the reflection element in such a way that the light is totally reflected at an interface formed by the sample material and the reflection element, wherein an angle at which the light is irradiated onto the sample material is greater than or equal to an angle for which total internal reflection occurs at the interface formed by the sample material and the reflection element for the light irradiated onto the sample material;

at least one detector device for determining a first intensity of light reflected from the sample material in a first polarisation state and for determining a second intensity of the light reflected from the sample material in a second polarisation state, wherein the first polarisation state is parallel polarised light and the second polarisation state is perpendicular polarised light; and at least one computing unit for forming the ratio between the first intensity and the second intensity, or vice versa, and for determining at least one optical property of the sample material based on the formed ratio, wherein the ratio between the first intensity and the second intensity is formed and the at least one optical property of the sample material is determined based on the formed ratio for a plurality of wavelengths for spectral analysis of the sample material.

16. The apparatus according to claim 15, wherein the at least one detector device comprises:

a first detector device for determining the first intensity of the light reflected from the sample material in the first polarisation state; and a second detector device for determining the second intensity of the light reflected from the sample material in the second polarisation state.

17. The apparatus according to claim 15, further comprising:

at least one polariser for splitting the light reflected from the sample material into the first polarisation state and the second polarisation state.

18. The apparatus according to claim 17, wherein the at least one polariser comprises:

a first polariser for splitting the light reflected from the sample material into the first polarisation state; and a second polariser for splitting the light reflected from the sample material into the second polarisation state.

19. The apparatus according to claim 15, wherein the at least one detector device is at least one synchronous detector.

* * * * *